Aug. 29, 1967  J. R. GRAHAM ETAL  3,338,013
VENTILATED PANEL CONSTRUCTION
Filed Feb. 26, 1965

INVENTORS
JOHN R. GRAHAM
WALTER K. MALEK
ROBERT H. COMP
ALVIN J. MIELKE
BY Richard H. MacCutcheon
ATTORNEY United States Patent Office 3,338,013
Patented Aug. 29, 1967

3,338,013
VENTILATED PANEL CONSTRUCTION
John R. Graham, Chesterland, Walter K. Malek, Hinckley, Robert H. Comp, Cleveland Heights, and Alvin J. Mielke, Avon, Ohio, assignors to Polyfoam Products Inc., Cuyahoga Heights, Ohio, a corporation of Ohio
Filed Feb. 26, 1965, Ser. No. 435,544
9 Claims. (Cl. 52—303)

ABSTRACT OF THE DISCLOSURE

In a door panel having a frame, a plastic material reinforcing core and opposite side facing sheets of hardboard, perforations extend through the core from one facing sheet to the other, and grooves extend along the core surfaces adjacent the hardboard and interconnecting the perforations.

Background and description

The present invention relates to construction of flush type panels of the type useful, for example, in an "overhead" garage door.

In such panels where one face is exposed to outdoor temperature (and humidity) and the opposite face is exposed to a heated (or air conditioned) interior, many vexatious problems have existed in the past. Exterior and marine plywood of sufficient thickness is heavy and expensive, often of inferior quality, and hard to paint and keep looking well. Synthetics such as "hardboard" have been known as panel facings but in practice they are "thin skins" which need a backing, i.e., a panel core. Such cores have heretofore often consisted of either spaced wood slats or a cardboard honeycomb. The wood slats have added to cost and weight, and the honeycomb has been found disadvantageous in having (1) insufficient gluing surfaces presented to the skins, (2) moisture entrapment, hence condensation and rot within the structure, and (3) insufficient thermal insulative properties. The so-called plastic foams have been used as cores for panels for roofing, pedestrian doors, and refrigerator doors, but for panels subjected to opposite face temperature differentials such foam cores have not been satisfactory, particularly if the span of the panel is relatively long.

It is an object of the present invention to provide simple and inexpensive means for overcoming the above mentioned difficulties.

According to our preference a panel, for example a so-called garage door section, has, front and rear, relatively thin skins suitable material and has a plastic foam between the skins.

We have found, and this is a part of our invention, that, for example in a double (two car) garage overhead door, the effect of inside-outside temperature differentials causes unequal expansions and contractions of the facing skins, and perhaps of the core material. This causes buckling, and warpage of the door, loosening of bond between core and facings, and resultant poor appearance, and also poor operation and binding (e.g., of supporting wheels on support tracks during opening and closing).

In broad aspect we meet these problems by degrading the excellent insulating properties of a foamed plastic core through the medium of perforations extending through the core from an outer (or front) face to an inner (or rear) face. Also, to obviate moisture and condensation problems, we interconnect perforations with one another and with a vent to a place outside the door. Thus, the core can still present relatively huge gluing surfaces and such surfaces remain substantially undisturbed (as regards their adhesion to facing skin) while at the same time some circulation is provided for, into and through the core.

Other objects and advantages will become apparent and the invention will be better understood from consideration of the following description taken in connection with the accompanying drawing, in which.

Figure 1:
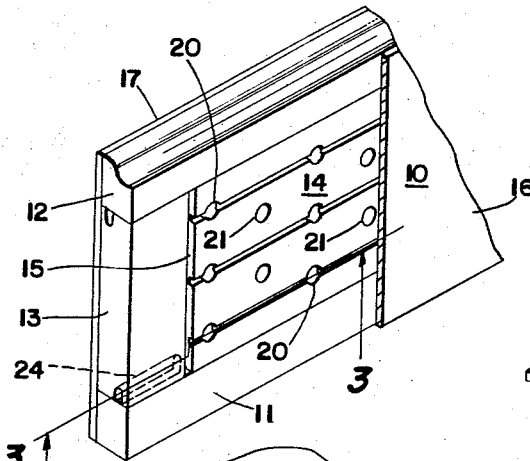
FIG. 1 is a perspective view, part broken away, of a portion of a panel constructed according to the invention.

Referring to FIG. 1, a so-called "flush" door panel 10 has a frame, which is assumed made of wood pieces, consisting of a bottom rail 11, a top rail 12, and several uprights or stiles, one of which is shown at 13. A solid core 14 of plastic foam is shown supported on the base 11. As shown, the foam 14 is spaced (e.g., by about ⅛") from each stile to provide vent spaces, of which the left end one is indicated at 15. Adhesively secured to the frame (11, 12, 13) and to the foam (14) is a front "skin" 16 and a back skin 17 each conveniently made of exterior grade hardboard such as that available from Superwood Corporation under the trademark "Superwood," and consisting of a synthetic resin and wood pulp, although a solid vinyl, or other plastic, or metal, wood or other material might be used for the skin instead. A full 1⅜" thick door, for example, may comprise ⅛" hardboard back and front and a 1⅛" thick frame around a 1⅛" foam core, and still be relatively light in weight and low in cost.

For the core a foamed plastic, such as that widely used for packaging and refrigerator insulation, is a preferred material. This is often sold as bead-board but we prefer to buy the "beads" and then injection mold and expand them (as by the application of steam) so that we can ourselves economically fashion through the foam the perforations and grooves about to be described. The beads are commercially available, e.g., as "Dylite," a trademark (of Koppers Company) for a free flowing expandable polystyrene whose foam density is controlled by heat.

Figure 2:
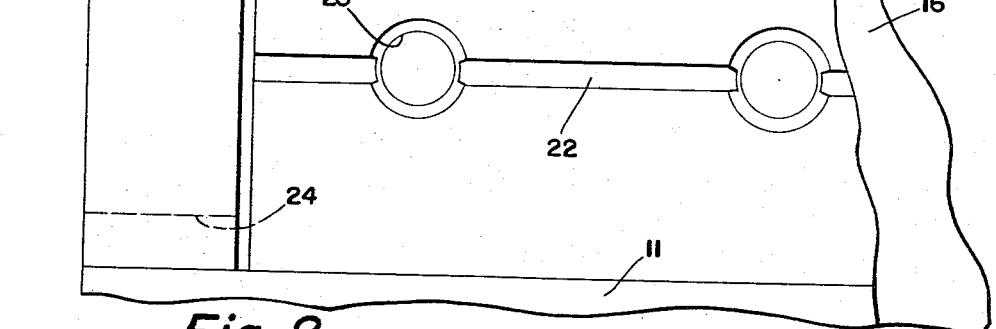
FIG. 2 is an enlarged scale, part broken away, front view of a panel portion otherwise like that shown in FIG. 1.
Figure 3:
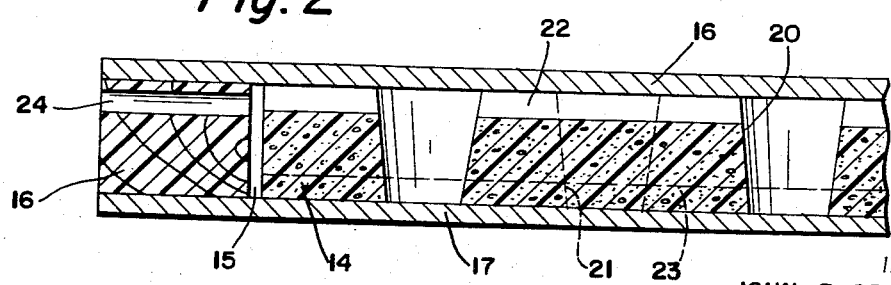
FIG. 3 is a longitudinal section as viewed along the lines 3—3 of FIG. 1.

In the drawing FIGS. 1–3, the foam 14 is shown perforate, holes 20, and holes 21 also, each extending through the core, from front skin 16 to rear skin 17. Optionally, as shown, about half of them (e.g., perforations 21) can be staggered along the length of the panel with respect to the other half (e.g., perforations 20).

As seen from comparing the full lines and broken lines in FIGS. 2 and 3, the perforations 20 communicate with longitudinal channel grooves 22 provided in the front face of the foam 14, and thus communicate with the spaces 15 at the end of the foam, while the perforations 21 are likewise connected with each other and with each end space 15, by means of longitudinal channel grooves 23 provided in the back face of the foam 14. At each end of the panel (the end not illustrated being assumed the same as that illustrated in FIGS. 1–3, except opposite hand) the respective space 15 communicates with a vent 24 through the respective stile 13, it being assumed that the door (or other final structure) will not be fitted so tight but that each end vent 24 may communicate with the outside, or, preferably, the cooler, ambient. If it is desired to have one or more stiles (uprights) throughout the panel intermediate the ends, then, preferably, they too will be separated from adjacent core materail by spaces comparable to 15, and they too will each be provided with a vent similar to 24 except that in such case the vent will communicate from one space like 15 to another, and not directly with outside ambient.

As already intimated, it is most convenient and economical to mold (e.g., injection mold and expand) the foam core concomitant with providing (by the shape of the mold) the perforations (20, 21) and the perforation connecting grooves (22, 23). For later ease in removing mold parts (not shown) we prefer to have the perforations (thus, the corresponding mold portions) frustroconical in shape, as indicated in FIGS. 2 and 3. For the same reason it may be advantageous to provide that the interconnecting grooves have tapered side walls. Alternatively, however, with some waste of material both perforations and grooves could readily be drilled, machined or sawed in ordinary bead-board, in which case the tapers would not be necessary, as may sometimes be the case for molding also.

Figure 4:
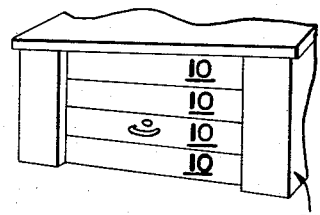
FIG. 4 is a reduced scale front view of a portion of a double garage provided with an overhead door made of plural panels each constructed as indicated, in part, in FIGS. 1–3.

As an illustration of one mode of use of panels constructed according to the invention, FIG. 4 is a perspective view of a portion of a two car garage 25 having a unitary overhead door assumed comprising four panels or sections 10 together with suitable hardware.

There is thus provided a construction of the class described capable of meeting the intended objects. Besides the low cost, light weight, and good appearance advantages already intimated, the selection and fabrication of materials indicated to be preferred assures against rotting and enables the panel to withstand government immersion tests, despite the venting to outside. And the venting through the core perforations does not materially detract from the excellent insulating properties of the foam, nor do the trough-like grooves. Yet the construction is such as to obviate any disadvantages of the foam's high insulativity, and the perforations, the grooves, and the communications with ambient all cooperate not only to prevent buckling and warpage by permitting thermal transfer but also permitting necessary moisture dissipation. Meanwhile the amount of, and placement of, the foam itself, between and nearly around the perforations and between the grooves, is such as to provide more than adequate reinforcement to obviate dishing of the "skin" and more than adequate adhesive gluing surfaces for holding such skin.

While we have illustrated and described a particular embodiment, various modifications may obviously be made, and different uses thought of, e.g., in roofing, siding, ceiling panels, or side-hinged doors, without departing from the true spirit and scope of the invention which we intend to have defined only by the appended claims taken with all reasonable equivalents.

We claim:

1. In a panel construction of the type having a frame, a central plastic material reinforcing core located within said frame, and opposite side facing sheets secured to said core, the novel combination of
perforations extending through the core, and establishing communication through said core from the vicinity of one opposite side facing sheet to another, and
grooves in said core and extending adjacent said facing sheets and interconnecting a plurality of said perforations to establish air convection between perforations as well as between facing sheets.

2. A panel construction as in claim 1 further characterized by the opposite side facing sheets being two relatively thin skins of hardboard each of which extends in first and second transverse directions to the outer limits of the frame, and the core being a foamed plastic which extends substantially coextensive with the limits of the frame in a third direction which is transverse to the first and second directions, whereby the skins may be flat while secured to both frame and core.

3. A door panel having a frame, a molded plastic material reinforcing core located within said frame, opposite side facing sheets secured to said core, means including tapered perforations in said core for establishing thermal communication through said core from one opposite side facing sheet to another, and means including tapered grooves, in said core and extending adjacent to said facing sheets, for interconnecting a plurality of said perforations and establishing air convection between perforations while the taper of perforations and of grooves contributes to ease of molding.

4. An overhead garage door comprising plural panels each of which has relatively long span structural material facing sheets, a reinforcing core of straight through perforated and surface grooved foamed plastic arranged between said facing sheets with the perforations of said core establishing air communication between the respective facing sheets and with the surface grooves of the core establishing air communication between said perforations and to ambient.

5. An overhead garage door of the type which is wider than the combined widths of two automobiles; and of the type having plural panels each extending the full width of the door, each of said panels having:
an insulating and reinforcing core of foamed polystyrene,
a frame surrounding while at least partially spaced from said core,
a pair of hardboard facing sheets respectively covering front and rear faces of said core and of said frame also, and respectively serving as front and back exterior of said door while providing front and back interior faces also,
means including at least one perforation through the frame and for establishing communication between ambient air outside of the frame on the one hand and the spacing between core and frame on the other,
means including passageways which are troughs in the core and extend parallel to the planes of major dimensions of facing sheets, and communicate with said spacing between core and frame and communicate each with at least one of said front and back interior faces formed by the facing sheets, and
means including pasageways which are perforations through the core, transverse to the planes of facing sheets major dimensions, and which communicate with said troughs, and thus with significant portions of the facing sheets.

6. In a panel construction of the type having a frame, a central plastic material reinforcing core located within said frame, and opposite side facing sheets secured to said core, the novel combination of
means including perforations which are individually frustro-conical in shape and which extend through the core, for establishing thermal communication through said core from one opposite side facing sheet to another, and
means including grooves, in said core and extending parallel to said facing sheets, for interconnecting a plurality of said frustro-conical perforations and establishing air convection between perforations.

7. A panel construction having a frame, a central plastic material reinforcing core located within said frame, opposite side facing sheets secured to said core, perforations extending through the core and establishing thermal communication through said core from one opposite side facing sheet to another, and grooves in said core and extending parallel to said facing sheets and interconnecting a plurality of said perforations and establishing air convection between perforations, with the grooves communicating with the perforations while the perforations are divided into groups each of which has its perforations staggered along a line of major dimension of the panel with respect to locations of perforations of another of said groups.

8. A panel construction as in claim 7 further characterized by the perforations of one of said groups being connected by grooves on one side of the core and adjacent to one facing sheet while the perforations of a second of said groups are connected by grooves on the opposite side of the core and adjacent to the opposite facing sheet.

9. An overhead garage door of the type which is wider than the combined widths of two automobiles; and of the type having plural panels each extending the full width of the door, each of said panels having:
- an insulating and reinforcing core of foamed polystyrene,
- a frame surrounding while at least partially spaced from said core,
- a pair of hardboard facing sheets respectively covering front and rear faces of said core and of said frame also,
- means for establishing communication between ambient air outside of the frame on the one hand and the spacing between core and frame on the other, and
- means including tapered vent holes through the polystyrene core and said means including, transverse to said vent holes and along the core, tapered troughs which interconnect the vent holes and also interconnect with the spacing between core and frame, said means being for establishing communication from said spacing to plural places interiorly of the core and therefrom to the inside of one facing sheet and to the inside of the other.

References Cited

UNITED STATES PATENTS

| | | | |
|---|---|---|---|
| 2,907,383 | 10/1959 | Kloote | 160—40 |
| 3,000,144 | 9/1961 | Kitson | 52—607 |

FOREIGN PATENTS

| | | |
|---|---|---|
| 646,572 | 8/1962 | Canada. |

JOHN E. MURTAGH, *Primary Examiner.*

C. G. MUELLER, *Assistant Examiner.*